United States Patent [19]

Englehart

[11] 4,138,099
[45] Feb. 6, 1979

[54] MATERIALS HANDLING DEVICE
[76] Inventor: Clem C. Englehart, P.O. Box 687, Aztec, N. Mex. 87410
[21] Appl. No.: 897,049
[22] Filed: Apr. 17, 1978
[51] Int. Cl.² .................................................. B25B 11/00
[52] U.S. Cl. ..................................... 269/17; 269/321 F
[58] Field of Search .............. 269/17, 321 F; 214/1 D

[56] References Cited
U.S. PATENT DOCUMENTS

| | | | |
|---|---|---|---|
| 2,503,388 | 4/1950 | Hedlund | 269/321 F |
| 4,050,671 | 9/1977 | Coleman | 269/17 |

Primary Examiner—Robert C. Watson
Attorney, Agent, or Firm—Walter R. Keller

[57] ABSTRACT

A materials handling device for handling sheets of plywood, sheet rock, plate glass or other flat materials. The device has a padded channel base, which supports the material, over a substantial length, thus eliminating problem of dents, and breakage in the material. At approximately the mid-point of the length of the channel base is affixed a padded broad clamp, which secures the material in the base channel. The securing of the material in the device, along the length of the base channel utilizes the inherent rigidity of the material to add to the rigidity of the device. The broad clamp is affixed to the base channel in such a manner that the broad clamp is high enough above the base channel to provide superior stability, minimizing tipping. At one end of the base channel is affixed a cross member, supporting floor engaging wheels, of sufficient width to insure stability. At the other end of the base channel is affixed, a handle to facilitate moving from one location to another. The device with the sheets of material therein can be easily moved by picking up one end of the material and rolling. The rigidity and stability of the device are sufficient to permit a carpenter to plane, saw, or otherwise on the upper edge of the material while the material is supported by the device.

1 Claim, 2 Drawing Figures

MATERIALS HANDLING DEVICE

BACKGROUND OF THE INVENTION

1. Field of the Invention

This invention is directed to a device for handling flat materials such as plywood, sheetrock, masonite, and for holding said materials on edge while a carpenter planes, saws, or otherwise works on or shapes said material.

2. Description of the Prior Art

At the present time there is no single device which has all of the desired characteristics and capabilities of the invention to enable a carpenter to support a plurality of sheet materials on edge so that the materials may be worked on prepared such as planning or cutting either singly or together; then moving the materials to the place where they will be finally used or stored; and to enable the carpenter or assistant to tip the materials on end for standing or stacking.

The manner in which carpenters presently handle sheet materials which need to be worked or prepared for fitting is merely to place them on a horse or lean them against the horses and do the required work. Then the carpenter or his assistant manually carry the material to where it is to be stored or utilized. This often results in broken materials, if the material if fragile such as sut sheet rock or pressboard, or damaged edges if the material is substantial such as plywood. More than one sheet of such materials, heavy doors, or panes of glass, are difficult for one person to handle conveniently and safely. However, with the invention, all of the above functions can be accomplished by a single person without difficulty. MORSE, U.S. Pat. No. 3,861,662 described a door carrier and hanging device. MORSE, however, must of necessity have two clamps which is the only support of the materials. There is in MORSE no provision for supporting the door or other material between the clamps; consequently the materials break and edges are damaged when placed on the single point front and rear support member. In MORSE, the location of the clamps provides no stability to the material, and material damage can result from sideways forces when the material is being worked. In addition, the inherent rigidity of the materials does not aid in increasing the stability of the device or rigidity as does the use of the base channel in the present invention.

SUMMARY OF THE INVENTION

A principal object of the present invention is provide a device for supporting, moving, and positioning flat materials such as plywood, sheet rock, masonite, plate glass and doors that permits a single person to readily, safely, and economically perform these functions.

Another object of the present invention is to provide a materials handling device which is simple and economical to construct and readily permits the person to quickly and accurately position the materials for installation or storage.

Still another object of the present invention is to provide a materials handling device that is a wheeled support that maintains the materials in either a horizontal or vertical position, permits the carpenter to work the materials, permits wheeling the materials to the installation site, and then permits the carpenter to position the materials quickly and accurately in a vertical or horizontal position.

DESCRIPTION OF THE PREFERRED EMBODIMENT

Figure 1:
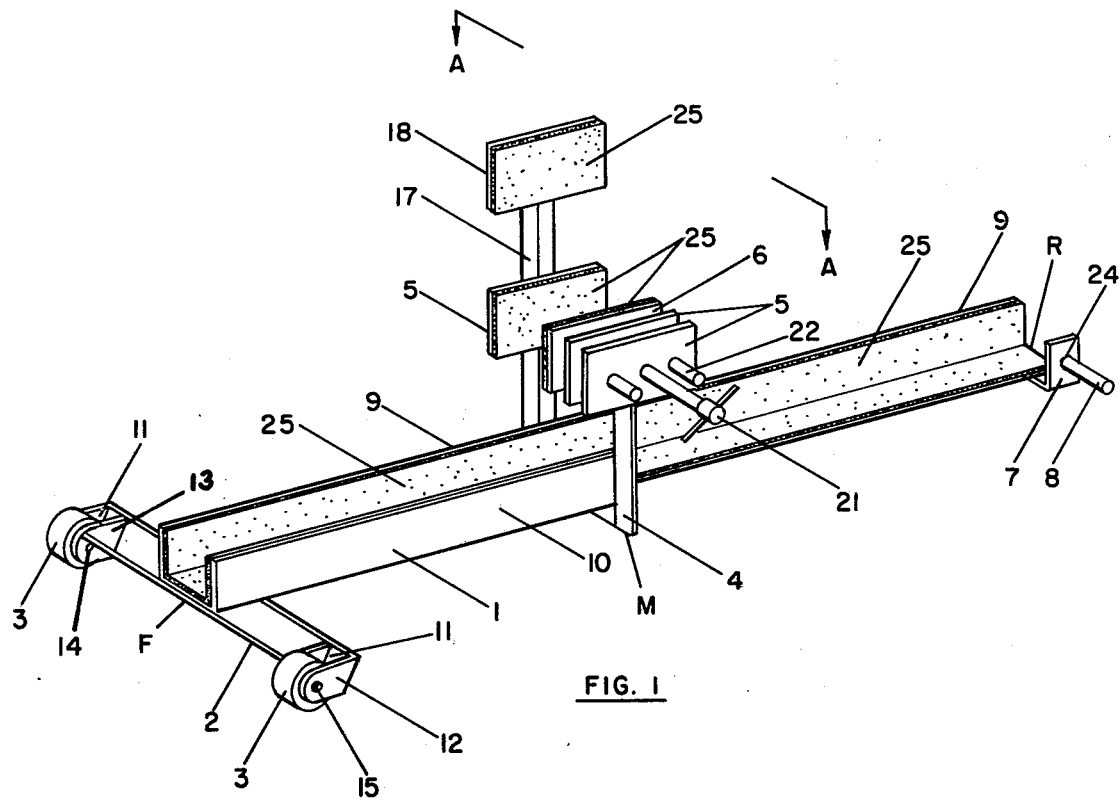
FIG. 1 is an isometric view of the invention.

Referring to the drawings, FIG. 1 shows the invention to comprise a base channel 1, and cross member 2, two wheels 3, and clamp support 4, a clamp back 5, a clamp 6, a handle support 7, and handle 8. The base channel 1 has a front end designated F and a rear end designated R, and an approximate mid-point designated M. The base channel 1 consists of an angle iron 9 its full length from F to R; and another angle iron 10 affixed such as by welding to the first angle iron, from the front end to the approximate mid-point M of the base channel 1 so that the cross section of the base channel 1 is a U at the front end F and a right angle at the rear end R. At the front end F of the base channel 1 rigidly attached, as if by welding, is a cross member 2 which consists of an angle iron. Cross member 2 is attached at right angles to the bottom and outside of the U shaped base channel 1 so that the right angle of the cross member 2 is disposed upwardly. Cross member 2 has a wheel access notch 11 on each end, and an end plate 12 on each end. Cross member 2 also has a wheel Support 13 attached adjacent to each wheel notch 11. The end plates 12, and wheel supports 13 are rigidly attached such as by welding to the cross member 2. Through the end plates 12 and wheel supports 13 are drilled axle holes 14. Wheels 3 and axles 15 are of standard construction are installed therein.

At mid-point M, clamp support 4 is welded to the base channel 1. Clamp support 4 consists of three pieces angle iron welded together at right angles. The clamp support 4 has a foot section 16 oriented such that the outer surface of one flange of the angle iron contacts the underneath side of the base channel 1, and the edge other flange of the angle iron rests on the floor. The foot section 16 is welded to the underneath side of the base channel 1. Welded or rigidly attached to the foot section 16, at right angles thereto is the long support arm 17. The long support arm 17 is affixed to the end of the foot section 16 which is adjacent to the vertical flange of the angle iron forming the base channel 1 at the rear end R. The long support arem 17 is oriented so that the outer surface of one flange of angle iron of the long support arm 17 is parallel to vertical sides of the base channel 1. Attached rigidly to the long support arm 17, parellel to the base channel 1 are two flat plates, a clamp back 5 and a material support 18. Both the clamp back 5 and material support 18 have substantial face area so that pressures against the material held in the device are spread across a large area on the material to minimize the possibility of denting or marking the materials. The material support 18 is high enough above the base channel 1 to be near the center of gravity of the material to provide support against bending of material, and typing of the material and the invention.

Rigidly affixed to the other end of the foot section 16 is the third piece of the clamp support 4, designated the short support 19. The short support 19 is affixed similar to the long support arm 17 in that the outer surface of one flange of the angle iron is parallel to the vertical sides of the base channel 1. Mounted and rigidly attached to the top of the short support 18 is the clamp 6. The clamp 6 consists of two clamp holders 20 rigidly attached to the short support 19. The clamp holders 20 have three holes, on in the center being threaded to accomodate the clamp screw 21, and that other two sized to accomodate clamp guide posts 22. The clamp screw 21 is rotatably attached to the clamp face plate 23 while the clamp guide posts 22 are fixedly attached to the clamp face plate 23 and restrain the clamp face plate 23 to its proper position. By turning the clamp screw 21, the clamp face plate 23 is moved toward or away from the material. The clamp face place 22 and the clamp back 6 are disposed to be opposing each other and are of identical shape to distribute pressures evenly.

At the rear end R of the base channel 1 a handle support 7 is attached to the base channel 1. The handle support 7 is a piece of strap iron bent to have a vertical surface which has a handle hole 24, through which a handle 8 passes and is thereby attached by bolting or other convenient and standard means.

The surfaces of the invention which will contact the materials to be handled, can be covered with a pliable member 25 such as carpeting. The pliable member 25 can be attached by suitable means such as epoxy glue. The sides and bottom of the base channel 1, the clamp face plate 23, the clamp back 6, and the material support 18 are all covered with pliable member 25.

Figure 2:
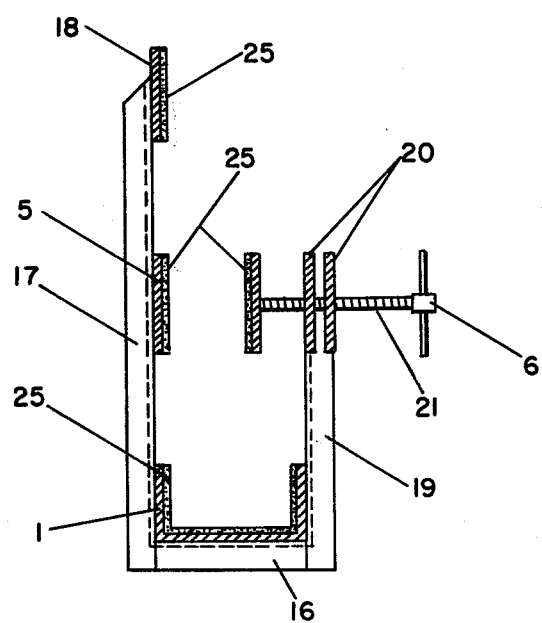
FIG. 2 is a sectional view cut on A—A of FIG. 1.

In usual usage of the invention, a person such as carpenter places the invention on the floor and then loads the desired number of sheets of material or doors into the base channel, and secures the material into the invention by turning the clamp screw 21, which presses the clamp face plate 22 against the material. The material is squeezed between the clamp face 22 and the clamp back 6, and is supported by the vertical face of the base channel 1, the clamp back 6, and the material support 18. The material is then held securely in a vertical position as shown in FIG. 2 so that the carpenter can work the edge of the material if desired. To move the materials the carpenter picks up the free end of the materials, so that on the wheels 3 of the invention are contacting the floor, and wheels the materials to the proper location. At the proper location, the materials can be set down in a horizontal position or in a vertical position as desired and the invention remaining secured to the stack of material provides wheels 3 for easy movement, precise positioning, and gentle safe handling.

It is readily noted that the invention provides a means for quickly, easily, economically, and safely handling sheets of flexible material such as masonite, fragile material such as panes of glass, heavy materials such as metal or wooden doors and soft materials such as sheet rock, by one person, thus minimizing labor costs and loss by breaking or damaging.

I claim:

1. A devise for handling sheets of flat materials such as plywood, glass, masonite, or doors, said devise comprising of:
    a. a base channel having a front end, a rear end, and a mid-point
    b. a cross member having two wheel access notches, two wheel supports, and two end plates
    c. two wheels and axles,
    d. a clamp support, having a long support arm and a short support
    e. a clamp back
    f. a material support
    g. a clamp with a clamp face plate
    h. a handle support
    i. a handle
    j. pliable material wherein the cross member, is rigidly affixed, such as, by welding at right angles to the base channel at the front end thereof, and the cross member having mounted therein a wheel on its axle in the wheel access notch, each axle being mounted between the wheel support and end plate, thereof; and the clamp support being rigidly affixed to the base channel, such as by welding, at the midpoint of the base channel in a position such that the base channel is perpendicular to the plane of the support member; the clamp is rigidly affixed, as by welding to the top of short support, so that the face of the clamp is perpendicular to the plane of the cross support, the clamp back is affixed such as by welding at a point on the long arm so that it is parallel to and faces the clamp; the material support is affixed such as by welding to the top of the long arm in such a position that it is parallel to and in the same plane as the clamp back; the handle support is attached by welding to the rear end of the base channel, and the handle attached thereto; and the pliable material affixed as by gluing to the surfaces of the base channel, clamp back, material support and clamp face plate that engage the materials to be handled.

* * * * *